US009218496B2

(12) United States Patent
Callahan et al.

(10) Patent No.: US 9,218,496 B2
(45) Date of Patent: *Dec. 22, 2015

(54) DYNAMICALLY UPDATING PRIVACY SETTINGS IN A SOCIAL NETWORK (71) Applicant: Facebook, Inc., Menlo Park, CA (US)

(72) Inventors: Ezra Callahan, Pasadena, CA (US); James H. Wang, San Francisco, CA (US); Nicolas Vera, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/205,837

(22) Filed: Mar. 12, 2014

(65) Prior Publication Data

US 2014/0196157 A1 Jul. 10, 2014

Related U.S. Application Data (63) Continuation of application No. 12/206,556, filed on Sep. 8, 2008, now Pat. No. 8,713,055.

(60) Provisional application No. 60/967,842, filed on Sep. 7, 2007.

(51) Int. Cl.
*G06F 17/30* (2006.01)
*G06F 21/62* (2013.01)
(Continued)

(52) U.S. Cl.
CPC .............. *G06F 21/62* (2013.01); *G06F 21/604* (2013.01); *G06F 21/6245* (2013.01);
(Continued)

(58) Field of Classification Search
CPC ... G06Q 50/01; G06Q 30/0269; G06Q 30/02; H04L 67/306; H04L 67/27; G06F 21/62; G06F 21/6204; G06F 21/6218; G06F 21/6227; G06F 21/6245; G06F 21/6263; G06F 2221/2115; G06F 2221/2119; G06F 2221/2141
USPC ............ 707/783, 784, 999.09, 785, 999.009; 709/204, 224; 715/741, 758, 772, 971; 705/319; 726/27, 28
See application file for complete search history.

(56) References Cited

U.S. PATENT DOCUMENTS 5,987,440 A 11/1999 O'Neil et al.
6,269,369 B1 7/2001 Robertson
(Continued)

FOREIGN PATENT DOCUMENTS

JP 2007-193611 8/2007
WO WO 2007/070676 6/2007
WO WO 2007/076150 7/2007

OTHER PUBLICATIONS

Saternus et al., A Middleware for Context-Aware Applications and Services Based on Messenger Protocols, Pervasive Computing and Communications Workshops, 2007. Percom Workshops '07. Fifth Annual IEEE International Conference on, DOI: 10.1109/PERCOMW.2007.7, Publication Year: 2007, pp. 467-471.*

(Continued)

*Primary Examiner* — Greta Robinson
(74) *Attorney, Agent, or Firm* — Fenwick & West LLP (57) ABSTRACT

A social network allows its members to regulate what data is accessible to other members using one or more privacy settings. A particular member of the social network can modify the one or privacy settings to grant or deny different users access to different data. When a member modifies a privacy setting, the social network determines which information pathways communicating data between members are affected. The affected information pathways are then modified responsive to the privacy setting to communicate data identified by the modified privacy setting and enforce the new privacy restrictions.

20 Claims, 3 Drawing Sheets (51) Int. Cl.
*G06F 21/60* (2013.01)
*G06Q 30/02* (2012.01)
*H04L 29/06* (2006.01)
*H04L 29/08* (2006.01)

(52) U.S. Cl.
CPC .......... *G06F 21/6263* (2013.01); *G06Q 30/02* (2013.01); *H04L 63/102* (2013.01); *H04L 67/306* (2013.01); *G06F 2221/2115* (2013.01); *G06F 2221/2119* (2013.01); *G06F 2221/2141* (2013.01)

(56) References Cited

U.S. PATENT DOCUMENTS

| | | | |
|---|---|---|---|
| 6,871,231 B2 | 3/2005 | Morris | |
| 6,889,213 B1 | 5/2005 | Douvikas et al. | |
| 7,047,202 B2 | 5/2006 | Jaipuria et al. | |
| 7,246,164 B2 | 7/2007 | Lehmann et al. | |
| 7,353,199 B1 | 4/2008 | DiStefano, III | |
| 7,461,071 B2 | 12/2008 | Fitzpatrick et al. | |
| 7,716,140 B1 | 5/2010 | Nielsen et al. | |
| 7,730,010 B2 | 6/2010 | Kishore et al. | |
| 8,402,094 B2 * | 3/2013 | Bosworth et al. | 709/206 |
| 8,595,146 B1 * | 11/2013 | Liew | 705/319 |
| 8,631,068 B1 * | 1/2014 | Jannink et al. | 709/204 |
| 8,713,055 B2 * | 4/2014 | Callahan et al. | 707/785 |
| 2002/0023230 A1 | 2/2002 | Bolnick et al. | |
| 2005/0198031 A1 | 9/2005 | Pezaris et al. | |
| 2006/0136419 A1 | 6/2006 | Brydon et al. | |
| 2006/0259852 A1 | 11/2006 | Upendran et al. | |
| 2007/0011236 A1 | 1/2007 | Ravula | |
| 2007/0162432 A1 | 7/2007 | Armstrong et al. | |
| 2007/0192299 A1 | 8/2007 | Zuckerberg et al. | |
| 2007/0250566 A1 | 10/2007 | Appelman et al. | |
| 2007/0255785 A1 | 11/2007 | Hayashi et al. | |
| 2008/0040475 A1 | 2/2008 | Bosworth et al. | |
| 2008/0065701 A1 | 3/2008 | Lindstrom et al. | |
| 2009/0019085 A1 | 1/2009 | Abhyanker | |
| 2009/0055476 A1 | 2/2009 | Markus et al. | |
| 2009/0070412 A1 | 3/2009 | D'Angelo et al. | |

OTHER PUBLICATIONS

PCT International Search Report and Written Opinion, PCT/US2008/075641, Nov. 18, 2008, 8 Pages.
IP Australia, Examiner's First Report on Australian Patent Application No. 2008295996, May 24, 2012, two pages.
PCT International Preliminary Report on Patentability, PCT Application No. PCT/US2008/075641, Mar. 18, 2010, six pages.
Japanese Patent Office, Office Action, Japanese Patent Application No. P2010-524230, Jun. 4, 2013, four pages.
Canadian Intellectual Property Office, First Office Action, Canadian Patent Application No. 2,696,945, May 2, 2013, two pages.
United States Office Action, U.S. Appl. No. 12/206,556, Jul. 30, 2013, 6 pages.
United States Office Action, U.S. Appl. No. 12/206,556, Oct. 24, 2012, 14 pages.
United States Office Action, U.S. Appl. No. 12/206,556, Feb. 2, 2012, 13 pages.
United States Office Action, U.S. Appl. No. 12/206,556, Aug. 8, 2011, 11 pages.
United States Office Action, U.S. Appl. No. 12/206,556, Dec. 17, 2010, 13 pages.

* cited by examiner

DYNAMICALLY UPDATING PRIVACY SETTINGS IN A SOCIAL NETWORK

CROSS REFERENCE TO RELATED APPLICATIONS

This application is a continuation of U.S. application Ser. No. 12/206,556, filed Sep. 8, 2008, which claims the benefit of U.S. Provisional Application No. 60/967,842, filed Sep. 7, 2007, both of which are hereby incorporated by reference in their entirety.

BACKGROUND

This invention relates generally to privacy settings, and in particular to dynamically updating privacy settings of a social network user.

Social networks, or social utilities that track and enable connections between members (including people, businesses, and other entities), have become prevalent in recent years. Social networking websites allow members to communicate information more efficiently. A member has a profile that describes the member's interests, geographic location, age, interests or hobbies or other information describing the member. For example, a member may post contact information, background information, job information, hobbies, and/or other member-specific data to a profile associated with the member on a social networking website. Other members can then review the posted data by browsing member profiles or searching for profiles including specific data. The social networking websites also allow members to associate themselves with other members, thus creating a web of connections among the members of the social networking website. These connections among the members can be exploited by the website to offer more relevant information to each member in view of the members' own stated interests in their connections.

Social networking websites typically allow users to select a variety of privacy settings related to applications, subscription-based services, other members and the like. The privacy settings regulate the ability of additional members to access data associated with a member. For example, the privacy settings allow the member to allow a certain group of members, such as the member's friends, to access member data while preventing members outside of the group from access member data. However, in a social network website member data is distributed using a variety of channels, some of which indirectly communicate data between members. For example, a first user may obtain information about a second user through data about the first user received by members who are common friends of the first user and the second user.

Conventionally, when a user modifies a privacy setting, direct data communication between the user and additional users is modified accordingly. However, because a social networking website includes multiple information pathways in which data can be communicated between users, to implement a privacy setting effectively, each affected information pathway needs to be modified to prevent data distribution through indirect data pathways. Hence, to implement privacy settings in a social networking website effectively, each information pathway communicating data between users needs to be identified and modified according to the privacy setting.

SUMMARY

In accordance with embodiments of the invention, members of social network can regulate what information about themselves is accessible to other members using one or more privacy settings. This allows members to preserve the privacy of their data, regulate what additional members can access their data or allow unrestricted access to their data. Using the one or more privacy settings, a member can provide different levels of accessibility to different data associated with the member. For example, a member can allow only the member's friends to access a subset of the data associated with the member and prevent other members from accessing data associated with the member. Members are permitted to modify the one or more privacy settings while using the social network.

A social network also includes multiple information pathways, such as: communicating a newsfeed story to a member, communicating a newsfeed story to a friend of the member, viewing a picture associated with the member, viewing a video associated with the member, communicating information about an event to the member, joining a group the member joins or returning a search result including data associated with the member. As each of these information pathways allows data to be distributed to various members, modification of a privacy setting is propagated to each information pathway to modify data about a member that is accessible by other members via an information pathway.

When a member modifies a privacy setting, by directly modifying the privacy setting or taking one or more other actions to adjust the privacy setting, the social network determines which information pathways between members are affected by the modified privacy setting. For example, if a first user modifies a privacy setting to prevent a second user from accessing data about the first user, the information pathways which communicate data to the second user (e.g., newsfeed stories communicated to the second user and newsfeed stories communicated to common friends of the first user and second user) are identified. The information pathways are then modified responsive to the privacy setting so that data identified by the privacy setting is communicated using the information pathways. For example, the social network terminates an information pathway between the first user and the second user if the second user is prohibited from receiving data about the first user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking website offers its members the ability to communicate and interact with other members of the website. In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social networking website.

In addition to interactions with other members, the social networking website provides members with the ability to take actions on various types of items supported by the website. These items may include groups or networks (where "networks" here refer not to physical communication networks, but rather social networks of people) to which members of the website may belong, events or calendar entries in which a member might be interested, computer-based applications that a member may use via the website, and transactions that allow members to buy or sell items via the website. These are just a few examples of the items upon which a member may act on a social networking website, and many others are possible.

Figure 1:
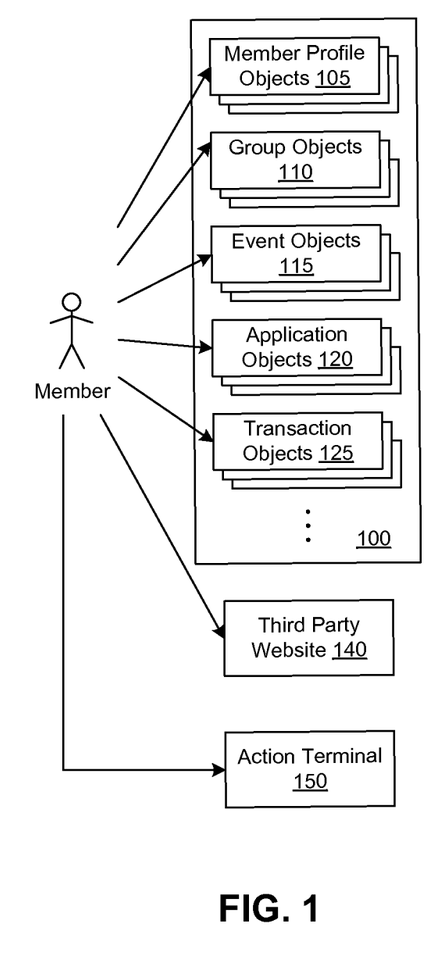
FIG. 1 is a high level block diagram of a system environment for providing targeted advertisements to members of a social networking website according to one embodiment of the invention.

As illustrated, the social networking website 100 maintains a number of objects for the different kinds of items with which a member may interact on the website 100. In one example embodiment, these objects include member profiles 105, group objects 110, event objects 115, application objects 120, and transaction objects 125 (respectively, hereinafter, groups 110, events 115, applications 120, and transactions 125). In one embodiment, an object is stored by the website 100 for each instance of its associated item. For example, a member profile 105 including a privacy setting is stored for each member who joins the website 100, a group 110 is stored for each group defined in the website 100, and so on. The types of objects and the data stored for each is described in more detail below in connection with FIG. 3, which illustrates an embodiment of the social networking website 100.

The member of the website 100 may take specific actions on the website 100, where each action is associated with one or more objects. The types of actions that a member may perform in connection with an object are defined for each object and largely depend on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features can be provided on a social networking website 100.

The social networking website 100 maintains a member profile 105 for each member of the website 100. Any action that a particular member takes with respect to another member is associated with each member's profile 105. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

A group 110 may be defined for a group or network of members. For example, a member may define a group to be a fan club for a particular band. The website 100 would maintain a group 110 for that fan club, which might include information about the band, media content (e.g., songs or music videos) by the band, and discussion boards on which members of the group can comment about the band. Accordingly, member actions that are possible with respect to a group 110 might include joining the group, viewing the content, listening to songs, watching videos, and posting a message on the discussion board.

Similarly, an event 115 may be defined for a particular event, such as a birthday party. A member may create the event 115 by defining information about the event such as the time and place and a list of invitees. Other members may accept the invitation, comment about the event, post their own content (e.g., pictures from the event), and perform any other actions enabled by the website 100 for the event 115. Accordingly, the creator of the event 115 as well as the invitees for the event may perform various actions that are associated with that 115.

The social networking website may also enable members to add applications to their profiles. These applications provide enhanced content and interactivity within the social networking website 100, which maintains an application object 120 for each application hosted in the system. The applications may be provided by the website operator and/or by third party developers. An example application is an enhanced messaging service, in which members can send virtual objects (such as a "gift" or "flowers") and an optional message to another member. The use of any functionality offered by the application may thus constitute an action by the member in connection with the application 120. In addition, continuing the example from above, the receipt of the virtual gift or message may also be considered an action in connection with the application 120. It can therefore be appreciated that actions may be passive and need not require active participation by a member.

Another type of object shown in the example of FIG. 1 is a transaction 125. A transaction object enables members to make transactions, such as buying, selling, renting, trading, or exchanging with other members. For example, a member may post a classified ad on the social networking website 100 to sell a car. The member would thus define a new transaction 125, which may include a description of the car, a picture, and an asking price. Other members can then view this information and possibly interact further with the transaction 125 by posting questions about the car and accepting the offer or making a counteroffer. Each of these interactions—view, question posting, offer, and counteroffer—are actions that are associated with the particular transaction 125.

Figure 3:
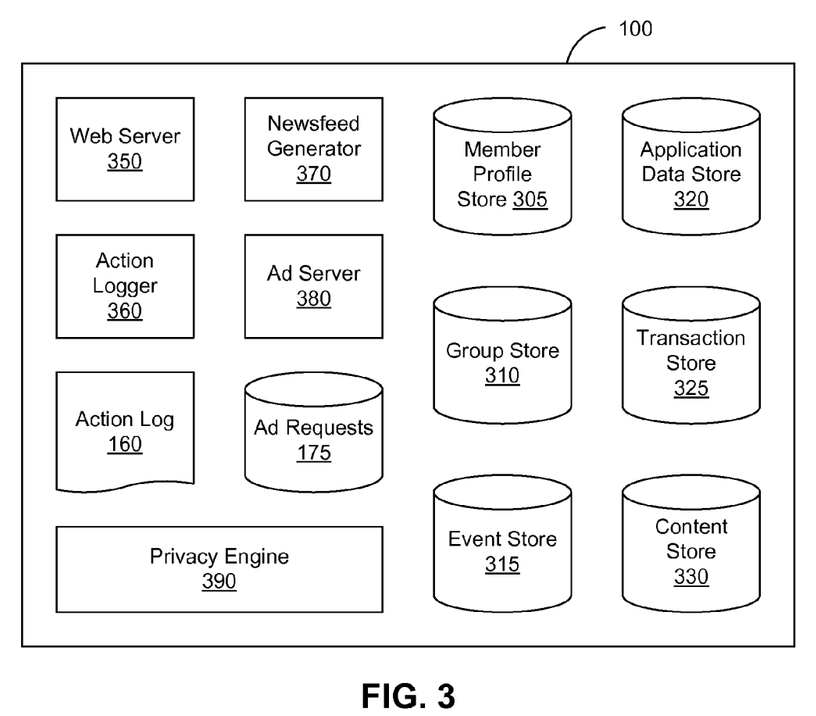
FIG. 3 is a block diagram of a social networking website, in accordance with an embodiment of the invention.

When a member takes an action on the social networking website 100, the action is recorded in an action log 160 (shown in FIG. 3). In one embodiment, the website 100 maintains the action log 160 as a database of entries. When an action is taken on the website 100, therefore, the website 100 adds an entry for that action to the log 160. In one embodiment, an entry comprises some or all of the following information:

Time: a timestamp of when the action occurred.
Member: an identifier for the member who performed the action.
Target: an identifier for the member to whom the action was directed.
Action Type: an identifier for the type of action performed.
Object: an identifier for an object acted on by the action.
Content: content associated with the action.

It can be appreciated that many types of actions that are possible in the web site 100 need not require all of this information. For example, if a member changes a picture associated with the member's profile, the action may be logged with just the member's identifier, an action type defining a picture change, and the picture or a link thereto as the content.

In one embodiment, the social networking website 100 also logs actions that a member takes on a third party website 140. The social networking website 100 may learn of the member's actions on the third party website 140 via any of a number of methods. For example, the third party website 140 may send a message to the social networking website 100 when a particular action by a member occurs on the third party website 140. In one example, if the third party website 140 is a commercial website on which members may purchase items, the third party website 140 may inform the social networking website 100 when a member of the social networking website 100 buys an item on the third party website 140.

In another embodiment, the social networking website 100 logs actions taken by its members in the real world. These actions may be recorded by an action terminal 150, which observes qualifying actions and then communicates that action to the social networking website 100. The communication may be via email, SMS, or any other appropriate means, where the communicated message includes sufficient information for the social networking website 100 to populate the action log 160 with an entry describing the action. The action terminal 150 may comprise any suitable devices or systems for the particular type of action to be tracked.

In one embodiment, the action to be tracked is a credit card transaction, where a member of the social networking website 100 may optionally opt in by registering a credit card. When the registered credit card is used in a qualifying way (e.g., a purchase made at a point of sale), the credit card company (or clearinghouse) sends a message to the social networking website 100. In this scenario, a computing system at the credit card company or clearinghouse serves as a action terminal 150. The message may contain information about the credit card transaction, such the item purchased, the date, and location of the purchase. The social networking system thus tracks real-world actions such as this purchase in the action log 160.

Another example illustrating real-world actions that may be tracked involves the member's location. A member may configure a cellular phone having location technology (e.g., GPS) to communicate the member's location to the social networking website 100. This may be accomplished, for example, by downloading an application to the cellular phone, where the application polls the location unit in the phone and sends a message containing the member's location to the social networking website 100. This may be performed periodically or upon certain triggering events associated with locations. For example, a triggering event can include the member being within to a specific city, or at particular destination such as a restaurant, business, or venue. In this application, the cellular phone (or other GPS-enabled device) serves as the action terminal 150.

Another example illustrating real-world actions that may be tracked involves what program material the member is accessing on a television system. A television and/or set-top receiver may act as an action terminal 150 and transmit a message indicating that a member is viewing (or recording) a particular program on a particular channel at a particular time. Again, these examples are presented to illustrate some of the types of devices and actions that may be captured as actions by a member and communicated to the social networking website 100. A limitless variety of other applications may be implemented to capture real-world actions associated with a particular member and send that information to the social networking website 100.

After an amount of time, the action log 160 will become populated with a number of entries that describe actions taken by the members of the social networking website 100. The action log 160 thus contains a very rich set of data about the actions of the members, and can be analyzed and filtered to identify trends and relationships in the actions of the members, as well as affinities between the members and various objects. This action log can, in some cases, be filtered to include only actions that are likely to be interesting to other members.

Website Architecture

Figure 2:
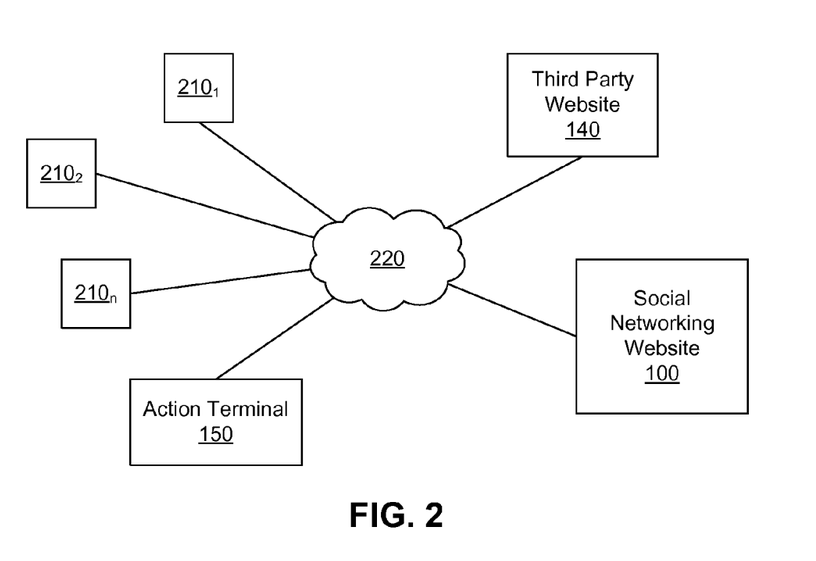
FIG. 2 is a network diagram of a system environment for providing ads to members of a social networking website, in accordance with an embodiment of the invention.

FIG. 2 is a high level block diagram illustrating a system environment suitable for operation of a social networking website 100. The system environment comprises one or more client devices 210, one or more third-party websites 140, a social networking website 100, and a network 220. In alternative configurations, different and/or additional modules can be included in the system.

The client devices 210 comprise one or more computing devices that can receive member input and can transmit and receive data via the network 220. For example, the client devices 210 may be desktop computers, laptop computers, smart phones, personal digital assistants (PDAs), or any other device including computing functionality and data communication capabilities. The client devices 220 are configured to communicate via network 220, which may comprise any combination of local area and/or wide area networks, using both wired and wireless communication systems. As described above, the third party website 140 and the action terminal 150 are coupled to the network 220 for communicating messages to the social networking website 100 about the members' actions off the website 100.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social networking website 100 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

FIG. 3 is an example block diagram of a social networking website 100. The social networking website 100 includes a web server 350, an action logger 360, an action log 160, a newsfeed generator 370, an ad server 380, a privacy engine 390, a database of ad requests 175, a member profile store 305, a group store 310, an event store 315, an application data store 320, a transaction store 325, and a content store 330. In other embodiments, the social networking website 100 may include additional, fewer, or different modules for various applications.

The web server 350 links the social networking website 100 via the network 220 to one or more client devices 210, as well as to one or more third party websites 140. The web server 350 may include a mail server or other messaging functionality for receiving and routing messages between the social networking website 100 and the client devices 210 or third party websites 140. The messages can be instant messages, queued messages (e.g., email), text and SMS messages, or any other suitable messaging technique.

The action logger 360 is capable of receiving communications from the web server 350 about member actions on and/or off the social networking website 100. The received actions can occur within the social networking website 100 as well on other websites, via an application programming interface exposed by the social networking website 100. In one embodiment, the social networking website 130 maintains the action log as a database of entries. When an action is taken on and/or off the social networking website 100, an entry for that action is generated and stored by the action logger 360. Examples of user actions within the social networking website 100 include sending a message to a friend, using a third-party application, joining a group, leaving a group, adding a relationship to another user, removing a relationship to another user, modifying a stored user profile, generating an event description or other modification or retrieval of data stored by the social networking website 100. Examples of user actions outside of the social networking website 100 include purchasing or reviewing a product or service using an online marketplace hosted by a third-party website 140, registering with or subscribing to a website hosted by a third-party application server 120, purchase, requesting information from the third-party website 140 similar actions performed on a third-party website 140.

The action logger 360 includes data describing the member performing the action, the time the action occurred, an identifier for the member who performed the action, an identifier for the member to whom the action was directed, an identifier for the type of action performed, an identifier for an object acted on by the action (e.g., an application), content associated with the action, where the action occurred and/or other data describing the action. It can be appreciated that many types of actions that are possible in the social networking website 100 need not require all of this information. For example, if a member changes a picture associated with the member's profile, the action may be logged with just the member's identifier, an action type defining a picture change, and the picture or a link thereto as the content. The action logger 360 can communicate with the member profile store 305, event store 315 and/or the group store 310 allowing events, users and/or groups to be associated with an action. The action logger 360 can organize the stored action data according to an action identifier which uniquely identifies each stored action.

The action logger 360 can store actions based on when the action occurred. In one embodiment, a single action logger 260 stores actions from all of the social network website 100 members and organizes the stored actions according to member identifiers or partitions the action log to allocate storage for different members. Alternatively, the social network website 100 includes multiple action loggers 360 associated with different subsets of members, such as by affiliation, group, geography, or the like.

The newsfeed generator 370 generates communications for each member about information that may be relevant to the member. These communications may take the form of stories, each story is an information message comprising one or a few lines of information about an action in the action log that is relevant to the particular member. The stories are presented to a member via one or more pages of the social networking website 100, for example in each member's home page or newsfeed page. A story is a message that summarizes, condenses, or abstracts one or more member actions from the action log 160. The generated news-feed stories can then be transmitted to one or more related members—e.g., the member's friends—allowing the member's actions to be shared with related members. The newsfeed generator 370 applies an affinity algorithm to the contents of the action log 160 and member profile store 305 to account for a member's relationships with other members or groups as specified in the member profile store 305 and/or group store 310 to select the actions from the action log 150 that are to be the basis of one or more stories for distribution to the related users. By accounting for the user relationships with other users and/or groups, the newsfeed generator 370 determines data from the action log 160 most relevant to other related users.

For example, the newsfeed generator 370 generates a message identifying a particular member (e.g., User A), the type of action and, optionally, another member, group or other entity affected by the action (e.g., "User A joined Group 1"). For various messages, the newsfeed generator 370 determines the interest of various related users to different messages associated with the given user. For example, the newsfeed generator 370 determines how recently a related user accessed data from or associated with the given user, how often a related user has accessed data from or associated with the given user, the amount of common or similar data in the profiles of the given user and the related user and/or other factors representative of user interest in a particular message. Based on the determined level of related user interest, a message is communicated to those related users with the highest interest in the information message. This process can also be applied to action logs 160, or action log 160 content, associated with members related to a specific member. For example, for a given user A, the action logs 160 of related members B, C, D, E can be processed for a selected interval, and one or more messages constructed for member A based on the actions of members B, C, D, and E. Thus, member A may receive messages such as "Users B and C are attending event X," or "User C sent User D a gift," or "User D is now friends with User E."

The ad server 380 is communicatively coupled to the member profile store 305, group store 310, database of ad requests 175 and to the action log 160. The ad server 380 selects an ad request from the database of ad requests 175 based on data from the member profile store 305, group store 310 and/or the action log 160 to identify an ad for presentation to the user. Hence, the ad server 380 uses data from a member profile, a member's group affiliation and prior actions to determine one or more ads that are most relevant to the characteristics and actions of a member.

The privacy engine 390 monitors the contents of the member profile store 305 to identify changes to the member profiles associated with one or more member. In an embodiment, the privacy engine 390 also monitors member behaviors and/or content received by a member. For example, the privacy engine 390 monitors applications in the application data store 320 accessed or retrieved by a member or monitors the newsfeed received by a member to identify additional, related, members. When a member modifies his or her associated member profile, such as a privacy setting included in the member profile, the privacy engine 390 synchronizes the changes to the member profile with the information received by the member making the change and/or the information communicated to other members from the member making the change. For example, if user A modifies the member profile associated with user B to prevent user B from receiving information about user A, news stories about user A previously accessible by user B are not longer accessible by user B. Thus, when a member changes a privacy setting in a member profile relating to other members or entities, information about each member is modified to correspond to the change in the privacy setting. Although the above example describes changing a privacy setting associated with other users, the member profile may include a plurality of privacy settings, such as a privacy setting associated with applications, a privacy setting associated with groups or a privacy setting associated with any other entity receiving or transmitting data via the social networking website 100.

In one embodiment, the privacy engine 390 analyzes the information pathways which provide data to a member, such as news stories received by a member, news stores received by friends of the member, pictures or other data associated with a member, events the member receives data about, groups the member is affiliated with and other sources of information about the member. These information pathways describe to the different ways in which the social networking website 100 distributes information, including the indirect distribution of information via common friends or common applications or sharing of pictures or other images. By analyzing the information pathways associated with a member, the privacy engine 390 ensures that changes to a member profile are propagated to multiple information pathways, more effectively limiting access to the data according to the modified member profile. For example, when user A changes a relationship between user A and user B, the privacy engine 390 determines the information pathways communicating data between user A and user B and modifies the data communicated via the information pathway between user A and user B. Hence, if user A's member profile is modified to block user B from accessing news stories about user A distributed to user A's friends, the privacy engine 390 ensures that user B cannot subsequently access pictures of user A having access limited to user A's friends.

In one embodiment, the privacy engine 390 also verifies member profile changes with the member associated with the member profile. For example, the privacy engine 390 emails user A to confirm that a change to user A's member profile limiting user B's access to stores about user A also limits user B's access to pictures associated with user A. This allows a member to differently limit access to different data associated with the member by modifying the member's profile. Additionally, the privacy engine 390 may allow a member to suppress one or more specific data items or stories from being distributed to other uses via the social network. When a specific data item or story is suppressed from distribution, the privacy engine 390 may also prevent a similar data item or story item from being distributed to other members.

Additionally, the privacy engine 390 may also monitor searches which include content from the social networking website 100. For example, the privacy engine 390 limits some or all of the information about a member that is returned in a search of the social networking website 100. For example, the privacy engine 390 compares a cookie or other identification mechanism associated with the member who last logged onto the social networking website 100 with the member performing a search to determine wither the member performing the search is allows to access certain user data as search results. For example, if user B is blocked from accessing information about user A, the privacy engine 390 prevents user A's information from being presented as search results responsive to user B performing a search of the social networking website 100.

In another embodiment, the privacy engine 390 provides different privacy settings for different groups or categories of users. For example, user A generates a list of friends, a list of work colleagues, a list of high school acquaintances and the like. The privacy engine 390 may allow user A to specify a privacy setting for each list generated by user A.

As discussed above, the social networking website 100 maintains data about a number of different types of objects with which a member may interact on the website 100. To this end, each of the member profile store 305, the group store 310, the event store 315, the application data store 320, and the transaction store 325 stores a data structure to manage the data for each instance of the corresponding type of object maintained by the website 100. The data structures comprise information fields that are suitable for the corresponding type of object. (For example, the event store 315 contains data structures that include the time and location for an event, whereas the member profile store 305 contains data structures with fields suitable for describing a member's profile.) When a new object of a particular type is created, the website 100 initializes a new data structure of the corresponding type, assigns a unique object identifier to it, and begins to add data to the object as needed. This might occur, for example, when a member defines a new event, wherein the website 100 would generate a new instance of an event in the event store 315, assign a unique identifier to the event, and begin to populate the fields of the event with information provided by the member.

Modification of Privacy Settings

Figure 4:
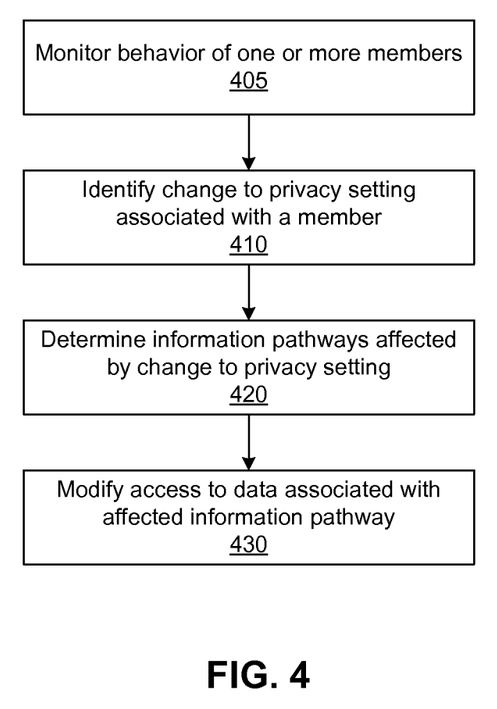
FIG. 4 is a flow chart of a process for dynamically updating a privacy setting of a social network user, in accordance with an embodiment of the invention.

FIG. 4 illustrates a process for dynamically modifying privacy settings, which may be performed by the privacy engine 390. The privacy engine 390 monitors 405 the behavior of one or more members while accessing the social networking website 100. For example, the privacy engine 390 monitors member activity, such as areas of the social networking website 100 accessed, changes to a member profile, member purchases, applications accessed or installed by a member and other actions taken via the social networking website 100. While monitoring 405 member behavior, the privacy engine 390 identifies 410 a change to a privacy setting associated with a user. For example, a member changes a privacy setting associated with an application, another member, a group, an event or other data maintained by the social networking website 100.

When a change to a privacy setting is identified 410, the privacy engine 390 determines 420 the information pathways affected by the change to the privacy setting. As the social networking website 100 allows data to be distributed to users in various methods, the relevant data distribution methods are determined 420 to propagate the change to the privacy setting. For example, if user A changes a privacy setting regulating user B's access to newsfeed stories about user A, the privacy engine 390 determines 410 that the change to the privacy setting also affects stories about user A that user B can access via common friends of user A and user B. The privacy engine 390 may also determine 420 that the change to user A's privacy setting also affects pictures associated with user A that user B may still access and/or the change to user A's privacy setting affects search results including user A. This allows the privacy engine 390 to propagate the privacy setting change to various information pathways providing access to data associated with user A. In an embodiment, the privacy engine 390 examines each information pathway associated with user A to determine whether the information pathway is affected by the change to the privacy setting.

The privacy engine 390 then modifies 430 access to information communicated using the information pathways affected by the privacy setting change. In one embodiment, the privacy engine 390 removes information pathways to prevent access to member data. For example, the privacy engine 390 removes one or more information pathways to restrict user B to accessing data about user A that user A has designated as available to "everyone." Alternatively, the privacy engine 390 generates one or more information pathways between user A and user B responsive to a privacy setting change granting user B access to data about user A.

Privacy Setting Configuration

Figure 5:
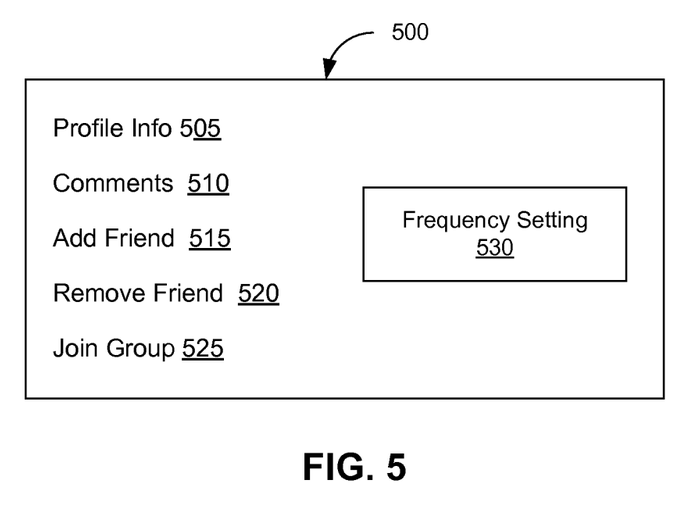
FIG. 5 is an example of privacy setting configuration, in accordance with an embodiment of the invention.

FIG. 5 is a diagram of some of the privacy settings 500 of a member profile. The privacy settings 500 may be stored by the social networking website 100 in the member profile store 305. In the example embodiment shown, the privacy settings 500 comprise an information field 505, a comment field 510, a friend addition field 515, a friend removal field 520 and a group field 525. The fields shown in FIG. 5 are merely examples, and in other embodiments, the privacy settings 500 include different and/or additional fields describing actions associated with the social networking website 100. In one embodiment, the privacy fields may set different privileges based on the type of action that can be communicated (e.g., the social network communicates when a user updates his or her profile, but not when the user adds new friends); based on the media in which the user appears (e.g., only friends of a user can see pictures or videos in which the user appears); or to whether the user's actions occurred outside the social network (e.g., the user may prevent the social network from publishing stories about the user's actions on another website). The privacy fields may also set what information can be accessed by other applications in the social network (e.g., an application may be prevented from accessing and thus using a member's profile picture).

The fields in the privacy settings 500 specify whether a newsfeed story is generated and transmitted to other members when an action involving the data described by the field occurs. For example, the information field 505 specifies whether a newsfeed story is communicated to other members when a member modifies one or more member profile settings. Similarly, the friend addition field 515 specifies whether a newsfeed story is transmitted when the member adds a new friend, such as by accepting a friend request from another member. In an embodiment, the privacy settings 500 are binary values, specifying whether or not a story is generated when various types of actions occur. In one embodiment, the privacy settings 500 also include a frequency setting 530 associated with one or more fields. The frequency setting 530 specifies how often newsfeed stories about a type of action are communicated to other members, allowing the member to regulate how frequently information is distributed to other members.

When a user modifies one or more privacy settings 500, the privacy engine 390 determines information pathways affected by the change and modifies the information pathways affected to implement the modified privacy setting. Additionally, the privacy engine 390 adjusts member data displayed in search results from a search engine internal to or external to the social networking website 100. This allows members to prevent member data from being returned in search results or specify a subset of member data that is returned in search results. The privacy engine 390 allows members to both limit access to member data to specific members while also allowing a subset of member data to be accessible as search engine results. For example, if user A elects to have profile data accessible through search engines but prevents user B from accessing user A's profile data, the privacy engine 390 modifies the information accessible by user B to prevent user B from accessing information about user A in a search result.

CONCLUSION

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    identifying a change in a privacy setting for a user of a social networking system, the change in the privacy setting affecting direct and indirect distribution of one or more items of user data associated with the user to a second user of the social networking system, wherein direct distribution is between the user and the second user, and indirect distribution is between the second user and another user of the social networking system that is connected to the user in the social networking system; and
    responsive to the identified change in the privacy setting, determining one or more information pathways of the social networking system that are affected by the change in the privacy setting, each information pathway being representative of a different way the user data may be distributed to users of the social networking system, and
    propagating the change to the determined one or more information pathways such that direct and indirect distribution user data to the second user is affected in accordance with the changed privacy setting.

2. The method of claim 1, wherein the social networking system comprises a social networking website.

3. The method of claim 1, wherein propagating the change to the determined one or more information pathways such that direct and indirect distribution of the user data to the second user is affected in accordance with the change in the privacy setting, further comprises:
    generating for the determined one or more information pathways a message that communicates the change in the privacy setting, wherein the generating incorporates the one or more items of user data of one or more users into the message subject to the privacy settings;
    communicating the message in the determined one or more information pathways to one or more users of the social networking system; and
    modifying at least one of the determined one or more information pathways affected by the changed privacy setting.

4. The method of claim 3, wherein the change in the privacy setting restricts direct and indirect distribution of the user data to the second user via an information pathway, and modifying at least one of the determined one or more information pathways affected by the change in the privacy setting comprises removing at least one of the determined one or more information pathways.

5. The method of claim 3, wherein the change in the privacy setting allows direct and indirect distribution of the user data to the second user, and modifying at least one of the determined information pathways affected by the change in the privacy setting comprises adding at least one new information pathway to the determined one or more information pathways.

6. The method of claim 1, wherein an information pathway comprises a newsfeed story received by the user, a newsfeed story received by a friend of the user, viewing a picture associated with the user, viewing a video associated with the user, an event the user receives data about, a group the user joins or a search engine result including data associated with the user.

7. The method of claim 1, further comprising:
    analyzing results of a search of the social networking system, the search result including data associated with the user for display to the second user via at least one of the determined one or more information pathways; and
    generating a modified search result by removing the data associated with the user from the search result responsive to the changed privacy setting.

8. A system comprising:
    a computer processor; and
    a privacy engine configured to:
        identify a change in a privacy setting for a user of a social networking system, the change in the privacy setting affecting direct and indirect distribution of one or more items of user data associated with the user to a second user of the social networking system, wherein direct distribution is between the user and the second user, and indirect distribution is between the second user and another user of the social networking system that is connected to the user in the social networking system; and responsive to the identified change in the privacy setting, determine one or more information pathways of the social networking system that are affected by the change in the privacy setting, each information pathway being representative of a different way the user data may be distributed to users of the social networking system, and propagate the change to the determined one or more information pathways such that direct and indirect distribution of the user data to the second user is affected in accordance with the changed privacy setting.

9. The system of claim 8, wherein the social networking system comprises a social networking website.

10. The system of claim 8, wherein the privacy engine is further configured to:

generate for the determined one or more information pathways a message that communicates the change in the privacy setting, wherein the generating incorporates the one or more items of user data of one or more users into the message subject to the privacy settings;

communicate the message in the determined one or more information pathways to one or more users of the social networking system; and modify at least one of the determined one or more information pathways affected by the changed privacy setting.

11. The system of claim 10, wherein the change in the privacy setting restricts direct and indirect distribution of the user data to the second user via an information pathway, and modifying at least one of the determined one or more information pathways affected by the change in the privacy setting comprises removing at least one of the determined one or more information pathways.

12. The system of claim 10, wherein the change in the privacy setting allows direct and indirect distribution of the user data to the second user, and modifying at least one of the determined information pathways affected by the change in the privacy setting comprises adding at least one new information pathway to the determined one or more information pathways.

13. The system of claim 8, wherein an information pathway comprises a newsfeed story received by the user, a newsfeed story received by a friend of the user, viewing a picture associated with the user, viewing a video associated with the user, an event the user receives data about, a group the user joins or a search engine result including data associated with the user.

14. The system of claim 8, wherein the privacy engine is further configured to:

analyze results of a search of the social networking system, the search result including data associated with the user for display to the second user via at least one of the determined one or more information pathways; and generate a modified search result by removing the data associated with the user from the search result responsive to the changed privacy setting.

15. A non-transitory computer-readable storage medium comprising instructions to be executed by a computer processor of computer system to carry out the steps of:

identifying a change in a privacy setting for a user of a social networking system, the change in the privacy setting affecting direct and indirect distribution of one or more items of user data associated with the user to a second user of the social networking system, wherein direct distribution is between the user and the second user, and indirect distribution is between the second user and another user of the social networking system that is connected to the user in the social networking system; and responsive to the identified change in the privacy setting, determining one or more information pathways of the social networking system that are affected by the change in the privacy setting, each information pathway being representative of a different way the user data may be distributed to users of the social networking system, and propagating the change to the determined one or more information pathways such that direct and indirect distribution user data to the second user is affected in accordance with the changed privacy setting.

16. The computer readable storage medium of claim 15, wherein propagating the change to the determined one or more information pathways such that direct and indirect distribution of the user data to the second user is affected in accordance with the change in the privacy setting, further comprises:

generating for the determined one or more information pathways a message that communicates the change in the privacy setting, wherein the generating incorporates the one or more items of user data of one or more users into the message subject to the privacy settings;

communicating the message in the determined one or more information pathways to one or more users of the social networking system; and modifying at least one of the determined one or more information pathways affected by the changed privacy setting.

17. The computer readable storage medium of claim 16, wherein the change in the privacy setting restricts direct and indirect distribution of the user data to the second user via an information pathway, and modifying at least one of the determined one or more information pathways affected by the change in the privacy setting comprises removing at least one of the determined one or more information pathways.

18. The computer readable storage medium of claim 16, wherein the change in the privacy setting allows direct and indirect distribution of the user data to the second user, and modifying at least one of the determined information pathways affected by the change in the privacy setting comprises adding at least one new information pathway to the determined one or more information pathways.

19. The computer readable storage medium of claim 15, wherein an information pathway comprises a newsfeed story received by the user, a newsfeed story received by a friend of the user, viewing a picture associated with the user, viewing a video associated with the user, an event the user receives data about, a group the user joins or a search engine result including data associated with the user.

20. The computer readable storage medium of claim 15, further comprising:

analyzing results of a search of the social networking system, the search result including data associated with the user for display to the second user via at least one of the determined one or more information pathways; and generating a modified search result by removing the data associated with the user from the search result responsive to the changed privacy setting.

* * * * *